United States Patent
Lin et al.

(10) Patent No.: US 11,377,573 B2
(45) Date of Patent: Jul. 5, 2022

(54) LIGHT CURABLE COMPOSITIONS

(71) Applicant: 3M INNOVATIVE PROPERTIES COMPANY, St. Paul, MN (US)

(72) Inventors: Ying Lin, Woodbury, MN (US); Sheng Ye, Redmond, WA (US); Timothy D. Dunbar, Woodbury, MN (US); Bradley D. Craig, Lake Elmo, MN (US); Dong-Wei Zhu, North Oaks, MN (US); Matthew J. Kryger, Hudson, WI (US); Richard J. Pokorny, Maplewood, MN (US); Michael A. Kropp, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/268,401

(22) PCT Filed: Sep. 5, 2019

(86) PCT No.: PCT/IB2019/057499
§ 371 (c)(1),
(2) Date: Feb. 12, 2021

(87) PCT Pub. No.: WO2020/049503
PCT Pub. Date: Mar. 12, 2020

(65) Prior Publication Data
US 2021/0198520 A1 Jul. 1, 2021

Related U.S. Application Data

(60) Provisional application No. 62/728,358, filed on Sep. 7, 2018.

(51) Int. Cl.
| | | |
|---|---|---|
| *C09D 175/06* | (2006.01) | |
| *B05D 3/06* | (2006.01) | |
| *B05D 7/00* | (2006.01) | |
| *C08K 9/06* | (2006.01) | |
| *C09D 4/06* | (2006.01) | |
| *C09D 7/62* | (2018.01) | |
| *C09D 7/40* | (2018.01) | |

(52) U.S. Cl.
CPC .............. *C09D 175/06* (2013.01); *B05D 3/06* (2013.01); *B05D 7/542* (2013.01); *C08K 9/06* (2013.01); *C09D 4/06* (2013.01); *C09D 7/62* (2018.01); *C09D 7/67* (2018.01); *C09D 7/69* (2018.01)

(58) Field of Classification Search
CPC .......... C09D 175/06; C09D 7/69; C09D 7/67; C09D 7/62; C09D 4/06; B05D 3/06; B05D 7/542; C08K 9/06
See application file for complete search history.

(56) References Cited

U.S. PATENT DOCUMENTS

| | | | |
|---|---|---|---|
| 5,523,152 A * | 6/1996 | Thurber | B24D 3/28 428/323 |
| 6,472,452 B2 | 10/2002 | Ruepping | |
| 2003/0087201 A1 | 5/2003 | Wu | |
| 2004/0115363 A1 | 6/2004 | Desai | |
| 2004/0152799 A1* | 8/2004 | Miller | C09D 11/101 522/104 |
| 2007/0021521 A1 | 1/2007 | Cheng | |
| 2009/0098305 A1 | 4/2009 | Cheng | |
| 2011/0218267 A1 | 9/2011 | Shinano | |
| 2011/0287190 A1 | 11/2011 | Bulluck | |
| 2012/0183784 A1 | 7/2012 | Russell | |
| 2013/0172419 A1 | 7/2013 | Saxena | |
| 2014/0179820 A1* | 6/2014 | Prenzel | C09J 133/08 522/35 |
| 2014/0272175 A1 | 9/2014 | Curatolo | |
| 2015/0056455 A1 | 2/2015 | Nebioglu | |
| 2016/0122473 A1 | 5/2016 | Monnier | |
| 2017/0306171 A1* | 10/2017 | Vidavsky | C08J 3/28 |

FOREIGN PATENT DOCUMENTS

| | | | | |
|---|---|---|---|---|
| DE | 102005032616 | * | 1/2007 | ............... C08J 7/16 |
| JP | 2008-069308 | | 3/2008 | |
| JP | 2011-063637 | | 3/2011 | |
| KR | 101161539 | | 7/2012 | |
| WO | WO 2008-045295 | | 4/2008 | |

(Continued)

OTHER PUBLICATIONS

English translation of DE 10 2005 032616 (Year: 2007).*
Howard et al. "Relationships between Conversion, Temperature, and Optical Properties during Composite Photopolymerization" Acta Biomater. Jun. 6, 2010(6): 2053-2059.*
Yin, "1,3-Dioxane Methylcoumarin as a Novel Photoinitiator for free radical polymerization", Journal of AppliedPolymer Science, 2012, vol. 125, pp. 2371-2371.
International Search report for PCT International Application No. PCT/IB2019/057499 dated Nov. 20, 2019, 4 pages.

*Primary Examiner* — Robert S Walters, Jr.

(57) ABSTRACT

A curable composition that includes a urethane multifunctional (meth)acrylate, an inorganic filler having a primary particle dimension of at least 200 nm, a photoinitiator system that can be activated by electromagnetic radiation in the range of 340-550 nm, a reactive diluent, and a reinforcing silica having a primary particle dimension of 100 nm of less. The sum of the absolute value of the difference in the refractive index of the filler and the refractive index of the composition cured without filler plus the birefringence of the filler is 0.054 or less, i.e. $0.054 \geq |n_{filler} - n_{matrix}| + \delta_{filler}$, where $n_{filler}$ is the refractive index of the filler, $n_{matrix}$ is the refractive index of the composition cured without filler, and $\delta_{filler}$ is the birefringence of the filler.

17 Claims, No Drawings

(56) References Cited

FOREIGN PATENT DOCUMENTS

| WO | WO 2017-025380 | 2/2017 |
| WO | WO 2018-165408 | 9/2018 |

* cited by examiner

LIGHT CURABLE COMPOSITIONS

CROSS REFERENCE TO RELATED APPLICATIONS

This application is a national stage filing under 35 U.S.C. 371 of PCT/IB2019/057499, filed 5 Sep. 2019, which claims the benefit of U.S. Provisional Application No. 62/728,358, filed 7 Sep. 2018, the disclosure of which are incorporated by reference in their entireties herein.

FIELD OF INVENTION

The present invention relates to light curable compositions that can be used, for example, as sealants in the automotive industry.

BACKGROUND

Curable compositions are often used in the automotive industry as sealants and protective coatings, particularly along joints or seams where two or more parts are secured together. Curing is typically activated by moisture and/or heat and can vary with composition and environmental conditions. Compositions which cure quickly (e.g., within 15 minutes) provide for very little work time during which the user can sculpt and configure the composition. On the other hand, compositions that cure relatively slowly offer longer work time but may take several hours to fully cure, thus requiring a waiting period before painting or other follow-up work can be done.

SUMMARY

The present disclosure describes light curable compositions that give the user greater control over work and cure times, thus minimizing or eliminating the disadvantages cited above.

In a first embodiment, the present disclosure provides a curable composition comprising: a urethane multifunctional (meth)acrylate; an inorganic filler having a primary particle dimension of at least 200 nm; a photoinitiator system that can be activated by electromagnetic radiation in the range of 340-550 nm; a reactive diluent; and reinforcing silica having a primary particle dimension of 100 nm or less, wherein $0.054 \geq |n_{filler} - n_{matrix}| + \delta_{filler}$, where $n_{filler}$ is the refractive index of the filler, $n_{matrix}$ the refractive index of the matrix is composition cured without filler, and $\delta_{filler}$ is the birefringence of the filler.

In a second embodiment, the present disclosure provides the composition of the first embodiment, wherein the composition comprises 10-60 wt. %, more particularly 15-50 wt. %, and even more particularly 20-40 wt. % of the urethane multifunctional (meth)acrylate.

In a third embodiment, the present disclosure provides the composition of the first or second embodiments, wherein the composition comprises 5-50 wt. % of the inorganic filler.

In a fourth embodiment, the present disclosure provides the composition of any one of the preceding embodiments, wherein the composition comprises 10-80 wt. %, more particularly 20-40 wt. % of the reactive diluent.

In a fifth embodiment, the present disclosure provides the composition of any one of the preceding embodiments, further comprising an adhesion promoter.

In a sixth embodiment, the present disclosure provides the composition of the fifth embodiment, wherein the composition comprises 15-40 wt. % of the adhesion promoter.

In a seventh embodiment, the present disclosure provides the composition of any one of the preceding embodiments, further comprising a corrosion inhibitor.

In an eighth embodiment, the present disclosure provides the composition of any one of the preceding embodiments, wherein the photoinitiator system can be activated by electromagnetic radiation in the range of 340-550 nm, more particularly 400-500 nm, and even more particularly 425-475 nm.

In a ninth embodiment, the present disclosure provides the composition of any one of the preceding embodiments, wherein the urethane multifunctional (meth)acrylate has a number average molecular weight in the range of 900-20,000 Daltons (grams/mole).

In a tenth embodiment, the present disclosure provides the composition of any one of the preceding embodiments, wherein the urethane multifunctional (meth)acrylate is selected from the group consisting of a urethane di(meth)acrylate, urethane tri(meth)acrylate, urethane tetra(meth)acrylate and combinations thereof.

In an eleventh embodiment, the present disclosure provides the composition of any one of the preceding embodiments, wherein the photoinitiator system comprises a photoinitiator having an extinction coefficient of from about 10 to about 2000 L/mol·cm at a wavelength from 340-550 nm.

In a twelfth embodiment, the present disclosure provides the composition of any one of the preceding embodiments, wherein the photoinitiator is

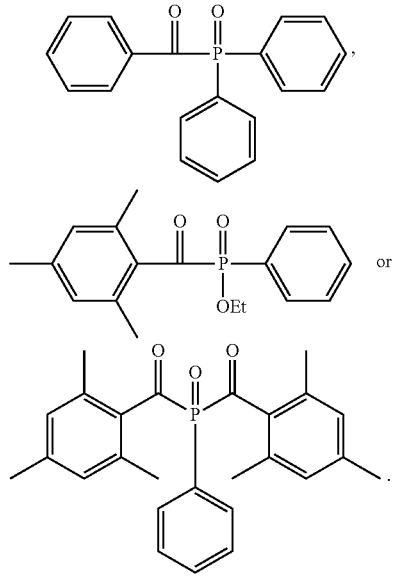

In a thirteenth embodiment, the present disclosure provides the composition of any one of the preceding embodiments, wherein the photoinitiator system comprises a photoinitiator and a photosensitizer.

In a fourteenth embodiment, the present disclosure provides the composition of any one of the preceding embodiments, wherein the reactive diluent comprises a mono(meth)acrylate, more particularly a mono(meth)acrylate that does not contain an acidic group, an amino group, an anhydride group or a hydroxyl group.

In a fifteenth embodiment, the present disclosure provides the composition of any one of the preceding embodiments, wherein the reactive diluent has a vapor pressure less than 0.1 Pa at 25° C., more particularly less than 0.01 Pa, and even more particularly less than 0.001 Pa.

In a sixteenth embodiment, the present disclosure provides the composition of any one of the fifth through fifteenth embodiments, wherein the adhesion promoter is a mono(meth)acrylate with at least one of a carboxylic acid and a carboxylic anhydride.

In a seventeenth embodiment, the present disclosure provides the composition of any one of the seventh through seventeenth embodiments, wherein the corrosion inhibitor comprises at least one of a triazole, an imidazoline, an amine, a zinc phosphate complex and dodecenyl succinic acid.

In an eighteenth embodiment, the present disclosure provides the composition of any one of the preceding embodiments, further comprising a crosslinking agent comprising a multifunctional (meth)acrylate, more particularly a crosslinking agent selected from the group consisting of a di(meth)acrylate, a tri(meth)acrylate, and combinations thereof.

In a nineteenth embodiment, the present disclosure provides the composition of any one of the preceding embodiments, further comprising a radical inhibitor.

In a twentieth embodiment, the present disclosure provides the composition of any one of the preceding embodiments, further comprising a photobleachable dye/agent.

In a twenty-first embodiment, the present disclosure provides the composition of any one of the preceding embodiments, wherein the composition upon curing has a $T_g$ no greater than 30° C., more particularly no greater than 20° C., and even more particularly no greater than 0° C.

In a twenty-second embodiment, the present disclosure provides the composition of any one of the preceding embodiments, wherein the composition upon curing has a depth of cure of at least 5 mm after electromagnetic radiation exposure in the range of 400-500 nm at an intensity of 2 $W/cm^2$ for 5 seconds.

In a twenty-third embodiment, the present disclosure provides a method comprising applying the composition from any one of the first through twentieth embodiments to a substrate, and exposing the composition to electromagnetic radiation in the range of 340-550 nm at an intensity of 0.1-5 $W/cm^2$.

In a twenty-fourth embodiment, the present disclosure provides the method of the twenty-third embodiment wherein the composition cures to a depth of cure of at least 5 mm when exposed to electromagnetic radiation in the range of 400-500 nm at an intensity of 2 $W/cm^2$ for 5 seconds.

In a twenty-fifth embodiment, the present disclosure provides the method of the twenty-third or twenty-fourth embodiments, wherein the composition upon curing has a $T_g$ no greater than 30° C., more particularly no greater than 20° C., and even more particularly no greater than 0° C.

In a twenty-sixth embodiment, the present disclosure provides the method of any one of the twenty-third through twenty-fifth embodiments, further comprising applying a primer to the substrate, wherein the primer is positioned between the substrate and composition.

The above summary of the present disclosure is not intended to describe each disclosed embodiment or every implementation of the present disclosure. The description that follows more particularly exemplifies illustrative embodiments.

DETAILED DESCRIPTION

Before any embodiments of the present disclosure are explained in detail, it is to be understood that the phraseology and terminology used herein is for the purpose of description and should not be regarded as limiting.

In this document, the terms "a," "an," or "the" are used to include one or more than one unless the context clearly dictates otherwise.

The term "(meth)acrylate" as used herein refers to monomers or oligomers comprising at least one (meth)acryloyloxy group having the formula $CH_2$=CR—(CO)—O— where R is hydrogen (i.e. acrylate) or methyl (i.e. methacrylate).

The term "alkyl" as used herein refers to straight chain and branched alkyl groups having from 1 to 40 carbon atoms ($C_1$-$C_{40}$), 1 to about 20 carbon atoms ($C_1$-$C_{20}$), 1 to 12 carbons ($C_1$-$C_{12}$), 1 to 8 carbon atoms ($C_1$-$C_8$), 1 to 6 carbon atoms ($C_1$-$C_6$) or, in some embodiments, from 3 to 6 carbon atoms ($C_3$-$C_6$). Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include isopropyl, iso-butyl, sec-butyl, t-butyl, neopentyl, isopentyl, and 2,2-dimethylpropyl groups.

The term "alkoxy" as used herein refers to the group —O-alkyl, wherein "alkyl" is defined herein.

The term "aryl" as used herein refers to cyclic aromatic hydrocarbons that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons ($C_6$-$C_{14}$) or from 6 to 10 carbon atoms ($C_6$-$C_{10}$) in the ring portions of the groups.

The term "aspect ratio" as used herein refers to average particle lengths (longest dimension) divided by average particle widths. The aspect ratio is determined by measuring the length and width of a plurality of particles on an electron micrograph and dividing the average of the lengths by the average of the widths.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "0.1% to 5%" or "0.1% to 5%" should be interpreted to include not just 0.1% to 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The light curable compositions of the present disclosure include a urethane multifunctional (meth)acrylate, an inorganic filler having a primary particle dimension of at least 200 nm, a photoinitiator system, a reactive diluent, and reinforcing silica having a primary particle dimension of 100 nm or less.

The photoinitiator system can be activated by electromagnetic radiation in the range of 340-550 nm. One of the challenges associated with electromagnetic radiation curable compositions is ensuring that the activating electromagnetic radiation sufficiently penetrates the composition to provide the desired depth of cure. Theoretically, longer wavelength electromagnetic radiation, such as visible light, penetrates deeper than shorter wavelength electromagnetic radiation, such as ultra violet (UV). However, the electromagnetic radiation must be energetic enough to efficiently trigger the curing process. The photoinitiator systems of the present disclosure strikes a balance between the two by utilizing electromagnetic radiation that is predominately at the blue end of the visible spectrum (e.g., blue light).

The inorganic filler is also chosen to minimize interference with the light curing process. The filler particles or fibers are of sufficient size that a mismatch in the refractive index between the filler and curing resin could reduce the penetration of light into the curable composition and render the depth of cure insufficient for the intended application. Therefore, to minimize the effects of light scatter by the filler and to insure sufficient depth of curing, the sum of the absolute value of the difference in the refractive index of the filler and the refractive index of the composition cured without filler plus the birefringence of the filler is 0.054 or less, i.e.

$$0.054 \geq |n_{filler} - n_{matrix}| + \delta_{filler}, \text{ where}$$

$n_{filler}$ is the refractive index of the filler,
$n_{matrix}$ is the refractive index of the composition cured without filler, and
$\delta_{filler}$ is the birefringence of the filler.

The inorganic fillers can improve impact resistance and increase hardness. Additionally, the inorganic fillers can reduce the amount of diluent used in the curable composition. Many suitable diluents are volatile organic compounds (VOCs) that can not only have a negative impact on the environment but can also generate unwanted odors as the diluent is vaporized by the heat generated during the curing process. The inorganic fillers can reduce the amount of diluent when contrasted with the curable composition without the filler. Additionally, the filler can act as a hint sink to reduce the temperature of the curing composition, which in turn reduces or eliminates volatilization of the diluent.

In practice, the curable compositions are applied to a substrate (e.g., single piece, joint between two pieces, etc.) and the composition is irradiated with electromagnetic radiation in the 340-550 nm range to cure the composition. Any suitable device emitting electromagnetic radiation in the 340-550 nm range and having a radiometric energy of about at least 0.1 W/cm$^2$ can be used to polymerize/cure the compositions of the various embodiments described herein. In some embodiments, a suitable light-emitting curing device can use light emitting diodes (LEDs), but need not be limited to light-emitting curing devices based on LEDs.

In some embodiments, the cured compositions typically form an elastomeric material having a T$_g$ no greater than 30° C., more particularly no greater than 20° C., and even more particularly no greater than 0° C.

The cured compositions can be polymerized/cured to a depth of cure of up to 30 mm within 2 minutes, within 1 minute, within 30 seconds, within 10 seconds, within 5 seconds or within 1 second per exposure area when the composition is irradiated with a light-emitting curing device emitting a wavelength of light of from 340-550 nm, 400-500 nm, or 425-475 and having a radiometric energy from 0.1-5 W/cm$^2$, 0.1-3 W/cm$^2$, or 0.1-2 W/cm$^2$. In some embodiments, the cured composition has a depth of cure of at least 5 mm after electromagnetic radiation exposure in the range of 400-500 nm at an intensity of 2 W/cm$^2$ for 5 seconds.

In some embodiments, substrates are treated with a suitable primer, such as 8682 (a single step primer) or AP-111, both available from 3M Company (St. Paul, Minn.) prior to application of the light curable composition to the substrate.

In some embodiments, the light curable compositions further comprise an adhesion promoter, a corrosion inhibitor, and combinations thereof. Such additives are particularly advantageous when applying the curable composition to metal substrates with, or without, a primer. In some embodiments, the cured compositions are able to protect unpainted steel such that less than 40%, less than 30%, less than 20%, less than 10%, less than 5% or less than 1% of the surface exhibits corrosion, as determined by ASTM B117.

The cured compositions of the various embodiments described herein advantageously exhibit a T-peel strength to unpainted steel of greater than 3 N/mm or greater than 5 N/mm as determined by T-peel test at an extension rate of 2.0 inch/min.

Each of the components in the light curable compositions are further described below.

Urethane Multifunctional (Meth)acrylates

Urethane multifunction (meth)acrylates are typically used to impart flexibility and toughness to the cured composition. Suitable urethane multifunctional (meth)acrylates for use in the curable compositions include oligomers and prepolymers comprising aliphatic urethane multifunctional (meth)acrylates and aromatic urethane multifunctional (meth)acrylates. In some embodiments, the urethane multifunctional (meth)acrylates are selected from urethane di(meth)acrylates, urethane tri(meth)acrylates, urethane tetra(meth)acrylates and combinations thereof. In some embodiments, the urethane multifunctional (meth)acrylate is a di(meth)acrylate. The term "multifunctional (meth)acrylate" as used herein means an oligomer or polymer containing two or more (meth)acryloyloxy groups.

Suitable urethane (meth)acrylates are can be made by reacting polyols with polyisocyanates to form urethane moieties and terminating the urethane moieties with multifunctional (meth)acrylates. In some embodiments, the urethane multifunctional (meth)acrylate is a urethane di(meth)acrylate comprising a carbocyclic aromatic group or a hydrocarbon group with at least four carbon atoms. In other embodiments, the urethane multifunctional (meth)acrylate is a urethane di(meth)acrylate comprising polytetramethylene oxide or polypropylene oxide. In some preferred embodiments, the urethane multifunctional (meth)acrylate comprises a polyester, a polypropylene oxide, or polytetramethylene oxide backbone. Polyethylene oxide backbones were found to be less favorable. In some embodiments, the urethane multifunctional (meth)acrylate is relatively hydrophobic.

Suitable aromatic urethane multifunctional (meth)acrylates can be derived from the reaction product of a polyol, an aromatic diisocyanate (e.g., toluene diisocyanate), and a hydroxyalkyl (meth)acrylate (e.g., hydroxyethyl (meth)acrylate and hydroxypropyl (meth)acrylate). Particularly desirable polyols include polyether polyols, polyester polyols, polylactone polyols, polysiloxane polyols, poly(alkylacrylate) polyols, and poly(glycidyl ether) polyols.

Suitable aliphatic urethane multifunctional (meth)acrylates can be derived from the reaction product of polyether polyols (e.g., hydroxyl terminated polypropylene oxide or hydroxyl terminated polytetramethylene oxide), aliphatic diisocyanates (e.g., isophorone diisocyanate), and a hydroxyalkyl (meth)acrylate (e.g., hydroxyethyl (meth)acrylate or hydroxypropyl (meth)acrylate). Suitable aliphatic urethane multifunctional (meth)acrylates also include an aliphatic urethane multifunctional (meth)acrylate having a polycaprolactone backbone. For example, a hydroxyethyl (meth)acrylate ring opens the caprolactone forming a monoalcohol that is reacted with isophorone diisocyanate, resulting hydrophobic aliphatic urethane di(meth)acrylate.

Commercially available urethane multifunctional (meth) acrylates include those from Allnex (Germany) under the trademark EBECRYL and designations 244, 264, 265, 1290, 4833, 4883, 8210, 8311, 8402, 8405, 8807, 5129, and 8411;

those available from Sartomer under the designations, CN 973H85, CN 985B88, CN 964, CN 944B85, CN 963B80, CN 973J75, CN 973H85, CN 929, CN 996, CN 966J75, CN 968, CN 980, CN 981, CN 982B88, CN 982B90, CN 983, CN991, CN 2920, CN 2921, CN 2922, CN 9001, CN 9005, CN 9006, CN 9007, CN 9009, CN 9010, CN 9031, CN 9782; GENOMER 4212, 4215, 4217, 4230, 4256, 4267, 4269, 4302, and 4316 and UA 00-022 available from Rahn; PHOTOMER 6892 and 6008 available from Cognis; and NK OLIGO U24A and U-15HA available from Kowa. Additional urethane multifunctional (meth)acrylates include the BR series of aliphatic urethane (meth)acrylates such as BR 144 or 970 available from Bomar Specialties or the LAROMER series of aliphatic urethane (meth)acrylates such as LAROMER LR 8987 from BASF.

Commercially available urethane multifunctional (meth) acrylates for use in the curable compositions include those known by the trade designations: PHOTOMER (for example, PHOTOMER 6010 from Henkel Corp., Hoboken, N.J.); EBECRYL (for example, EBECRYL 220 (a hexafunctional aromatic urethane acrylate of molecular weight 1000), EBECRYL 284 (aliphatic urethane diacrylate of 1200 grams/mole molecular weight diluted with 1,6-hexanediol diacrylate), EBECRYL 4827 (aromatic urethane diacrylate of 1600 grams/mole molecular weight), EBECRYL 4830 (aliphatic urethane diacrylate of 1200 grams/mole molecular weight diluted with tetraethylene glycol diacrylate), EBECRYL 6602 (trifunctional aromatic urethane acrylate of 1300 grams/mole molecular weight diluted with trimethylolpropane ethoxy triacrylate), and EBECRYL 840 (aliphatic urethane diacrylate of 1000 grams/mole molecular weight)) from Allnex (Germany); SARTOMER (for example, SARTOMER 9635, 9645, 9655, 963-B80, and 966-A80) from Sartomer Co., West Chester, Pa.; and UVITHANE (for example, UVITHANE 782) from Morton International, Chicago, Ill.

Commercially available aliphatic urethane multifunctional (meth)acrylates include those available from Soltech Ltd., Kyoungnam, Korea, such as SU 500 (aliphatic urethane diacrylate with isobornyl acrylate), SU 5020 (hexafunctional aliphatic urethane acrylate oligomer with 26% butyl acetate), SU 5030 (hexa-functional aliphatic urethane acrylate oligomer with 31% butyl acetate), SU 5039 (nona (9)-functional aliphatic urethane acrylate oligomer), SU 511 (aliphatic urethane diacrylate), SU 512 (aliphatic urethane diacrylate), SU 514 (aliphatic urethane diacrylate with hexane diol diacrylate (HDDA)), SU 591 (aliphatic urethane triacrylate with N-(2-hydroxypropyl) methacrylamide), SU 520 (deca(10)-functional aliphatic urethane acrylate), SU 522 (hexa-functional aliphatic urethane acrylate), SU 5225 (aliphatic urethane diacrylate with isobornyl acrylate), SU 522B (hexa-functional aliphatic urethane acrylate), SU 5260 (aliphatic urethane triacrylate), SU 5270 (aliphatic urethane diacrylate), SU 530 (aliphatic urethane diacrylate), SU 5347 (aliphatic urethane diacrylate), SU 542 (low viscosity aliphatic urethane diacrylate), SU 543 (low viscosity aliphatic urethane diacrylate), SU 564 (aliphatic urethane triacrylate with HDDA), SU 565 (aliphatic urethane triacrylate with tripropylene glycol diacrylate), SU 570 (aliphatic urethane diacrylate), SU 571 (hexa functional aliphatic urethane diacrylate), SU 574 (aliphatic urethane triacrylate with HDDA), SU 574B (aliphatic urethane triacrylate with HDDA), SU 580 (aliphatic urethane diacrylate), SU 584 (aliphatic urethane triacrylate with HDDA), SU 588 (aliphatic urethane triacrylate with 2-(2-ethoxyethoxy)ethyl acrylate), and SU 594 (aliphatic urethane triacrylate with HDDA).

Commercially available aromatic urethane multifunctional (meth)acrylates include those available from Soltech Ltd., Kyoungnam, Korea, such as SU 704 (aromatic urethane triacrylate with HDDA), SU 710 (aromatic urethane diacrylate), SU 720 (hexa-functional aromatic urethane acrylate), and SU 7206 (aromatic urethane triacrylate with trimethylolpropane triacrylate).

In some embodiments, the urethane multifunction (meth) acrylate has a number average molecular weight of 900-20,000 Daltons (grams/mole) as measure using Gel Permeation Chromatography. If the number average molecular weight is less than 900 Daltons, the cured material tends to be brittle, leading to low T-peel strength. If the number average molecular weight is greater than 20,000 Daltons, however, the viscosity of the polymerizable composition may be too high. In some embodiments, the urethane multifunction (meth)acrylate has a number average molecular weight of 3,000-20,000 Daltons or 5,000 to 20,000 Daltons as measured using Gel Permeation Chromatography.

In some embodiments, the light curable composition comprises 10-60 wt. %, 15-50 wt. %, or 20-40 wt. % of one or more urethane multifunctional (meth)acrylates.

Inorganic Fillers

As noted above, it is preferable to use inorganic fillers that reduce or minimize the effects of light scattering in order to insure sufficient depth of curing. Therefore, inorganic fillers of the present disclosure are selected such that the sum of the absolute value of the difference in the refractive index of the filler and the refractive index of the composition cured without filler plus the birefringence of the filler is 0.054 or less.

In some embodiments, the inorganic filler has a higher refractive index than the organic phase of the curable composition (i.e. everything but the inorganic filler). In some embodiments, the refractive index of the inorganic filler is between the refractive indices of the organic phases of the uncured and cured compositions. More particularly, in some embodiments, the refractive index of the inorganic filler is midway between the refractive indices of the organic phases of the uncured and the cured compositions.

In some embodiments, the inorganic filler may have a refractive index of at least 1.490, 1.500, 1.510, 1.520, 1.530, or 1.540, the organic phase of the curable composition may have a refractive index of 1.460, 1.470, 1.480, 1.490, 1.500, 1.510, and the cured organic phase of the composition may have a refractive index of 1.480, 1.490, 1.500, 1.510, 1.520, 1.530. As curing proceeds, the curable composition typically becomes more and more translucent, enabling higher depth of cure.

Fillers may be either particulate or fibrous in nature. Particulate fillers may generally be defined as having a length to width ratio, or aspect ratio, of 20:1 or less, and more commonly 10:1 or less. Fibers can be defined as having aspect ratios greater than 20:1, or more commonly greater than 100:1. The shape of the particles can vary, ranging from spherical to ellipsoidal, or more planar such as flakes or discs. The macroscopic properties can be highly dependent on the shape of the filler particles, in particular the uniformity of the shape.

Suitable inorganic fillers have at least one dimension greater than 200 nm. For example, in the case of spherical fillers, the diameter of the particles is at least 200 nm. In the case of fibers, the length (longest dimension) of a fiber is at least 200 nm.

Exemplary inorganic fillers include inorganic metal oxides, inorganic metal hydroxides, inorganic metal carbides, inorganic metal nitrides such as ceramics, and various glass compositions (e.g., borate glasses, phosphate glasses, and fluoroaluminosilicate). More particularly, inorganic fillers include alumina trihydrate, alumina, silica, silicate, beryllia, zirconia, magnesium oxide, calcium oxide, zinc oxide, titanium dioxide, aluminum titanate, silicon carbide, silicon nitride, aluminum nitride, titanium nitride, aluminum trihydrate, and magnesium hydroxide.

Commercially available inorganic fillers include 3M™ CERAMIC MICROSPHERE WHITE GRADES W-210, W-410 and W-610 from 3M Company (St. Paul, Minn.), MINEX® brand micronized functional fillers such as Minex® 3 Nepheline Syenite, Minex® 7 Nepheline Syenite and Minex® 10 Nepheline Syenite from Carry Company (Addison, Ill.), Schott dental glass type GM27884 from Schott (Southbridge, Mass.), DRAGONITE™-XR halloysite clay from Applied Minerals (New York, N.Y.). In preferred embodiments, the filler is uniformly distributed throughout the curable composition and does not separate from the polymerizable composition before or during curing.

In some embodiments, the light curable composition comprises 5-50 wt. % of one or more inorganic fillers. Compositions comprising less than 5 wt. % of inorganic filler typically require a higher amount of diluent (e.g., volatile organic compounds) and reduce the potential heat sink effect mentioned above. Compositions comprising greater than 50 wt. % can diminish cure depth.

Reinforcing Silica

Reinforcing silica can be used as a viscosity and thixotropy modifier. In some embodiments, the viscosity of the light curable composition is 5-1,000 PaS. For example, the silica may be added in amounts to achieve a viscosity such that the composition is self-wetting, i.e. freely flowing on the surface of the substrate and filling voids. The silica may be added in amounts such that the composition is sprayable. Finally, the silica may be added in amounts such that the composition forms a caulk for filling spaces, voids or interstices of substrates.

Suitable reinforcing silicas have a primary particle dimension no greater than 100 nm and, therefore, have little to no effect on the penetration of light within the composition during curing. As used herein, the term "primary particle" means a particle in unaggregated form, although the primary particle may be combined with other primary particles to form aggregates on the micron size scale. Reinforcing silicas include fused or fumed silicas and may be untreated or treated so as to alter the chemical nature of their surface. Examples of treated fumed silicas include polydimethylsiloxane-treated silicas, hexamethyldisilazane-treated silicas and silicas that are surface treated with alkyltrimethoxysilanes, such as hexyl (C6), octyl (C8), decyl (C10), hexadecyl (C16), and octadecyl(C18)trimethoxysilanes. Commercially available treated silicas are available from Cabot Corporation under the tradename CAB-O-SIL ND-TS, such as CAB-O-SIL TS 720, 710, 610, 530, and Degussa Corporation under the tradename AEROSIL, such as AEROSIL R805.

Of the untreated silicas, amorphous and hydrous silicas may be used. Commercially available amorphous silicas include AEROSIL 300 with an average particle size of the primary particles of about 7 nm, AEROSIL 200 with an average particle size of the primary particles of about 12 nm, AEROSIL 130 with an average size of the primary particles of about 16 nm. Commercially available hydrous silicas include NIPSIL E150 with an average particle size of 4.5 nm, NIPSIL E200A with and average particle size of 2.0 nm, and NIPSIL E220A with an average particle size of 1.0 nm (manufactured by Japan Silica Kogya Inc.).

In some embodiments, the light curable composition comprises 1-10 wt. % of one or more reinforcing silicas.

Photoinitiator Systems

The photoinitiator systems comprise a photoinitiator and optional photosensitizer. Suitable photoinitiators can be activated by electromagnetic radiation in the 340-550 nm range and have an extinction coefficient of from 10 to 2000 L/mol·cm (e.g., 50 to 500 L/mol·cm or 100 to 700 L/mol·cm) at a wavelength from 340-550 nm. Alternatively, photoinitiators can be used in combination with photosensitizers that absorb at wavelengths above 340 nm and excite the photoinitiator through energy transfer. In some embodiments, the composition upon curing has a depth of cure of at least 5 mm after electromagnetic radiation exposure in the range of 400 to 500 nm at an intensity of 2 W/cm² for 5 seconds.

Suitable photoinitiators include quinones, coumarins, phosphine oxides, phosphinates, mixtures thereof and the like. Commercially available photoinitiators include camphorquinone (CPQ), phosphine oxides such as LUCIRIN® TPO, LUCIRIN® TPO-L, LUCIRIN® TPO-XL available from BASF or IRGACURE® 819, IRGACURE® 2100 available from Ciba, and phosphine oxides available from IGM Resins USA Inc. under the OMNIRAD trade designation such ethyl-2,4,6-trimethylbenzoylphenyl phosphinate (e.g., available as OMNIRAD TPO-L), 2,4,6-trimethylbenzoyl-diphenyl-phosphine oxide (e.g., available as OMNIRAD TPO), and bis-(2,4,6-trimethylbenzoyl)-phenylphosphine oxide (e.g., available as OMNIRAD 819). In some embodiments, the photoinitiator is

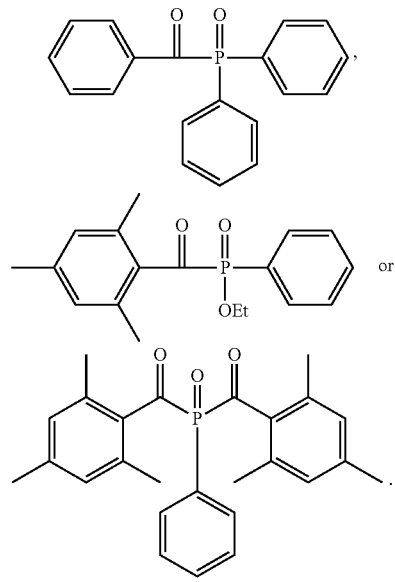

In some embodiments, the light curable composition comprises less than 5 wt. %, more particularly 2-3 wt. % of one or more photoinitiators.

Examples of suitable photosensitizers include, for example, camphorquinone, coumarin photosensitizers such as (7-ethoxy-4-methylcoumarin-3-yl)phenyliodonium hexafluoroantimonate, (7-ethoxy-4-methylcoumarin-6-yl)] phenyliodonium hexafluoroantimonate, (7-ethoxy-4-methylcoumarin-3-yl)phenyliodonium hexafluorophosphate, (7-ethoxy-4-methylcoumarin-6-yl)]phenyliodonium hexafluorophosphate, such as those described in Ortyl and Popielarz, Polimery 57: 510-517 (2012); 1,3-dioxane methyl coumarin, such as is described in Yin et al., Journal of Applied Polymer Science 125: 2371-2371 (2012); coumarin dye; and ketocoumarin dye. In some embodiments, the light curing composition comprises 0.0001 wt. % to 5 wt. % of one or more photosensitizers.

Adhesion Promoters

Suitable adhesion promoters include acid-functionalized (meth)acrylate monomers such as acrylic acid (AA), methacrylic acid (MAA), beta-carboxyethyl acrylate (β-CEA), 2-hydroxy ethyl methacrylate (HEMA) phosphate, mono-2-(Methacryloyloxy)ethyl succinate (known as HEMA succinate commercially available from Esstech Inc, Essington, Pa.), 2-hydroxyethyl methacrylate (HEMA) maleate (known as HEMA maleate commercially available from Esstech Inc, Essington, Pa.), (meth)acrylic phosphonic acids and esters 6-methacryloxyhexyl phosphate, 10-methacryloxydecyl phosphate, glycerol phosphate mono(meth)acrylates, caprolactone methacrylate phosphate, bis((meth)acryloxyethyl) phosphate, and glycerol phosphate di(meth)acrylates.

Suitable adhesion promoters also include acid-precursor functionalities, such as anhydride-functionalized (meth) acrylate monomers (e.g. 4-Methacryloxyethyl trimellitic anhydride), and pyrophosphate-functionalized (meth)acylate monomers (e.g. tetramethacryloxyethyl pyrophosphate).

An adhesion promoter may be used alone or in combination with one or more additional adhesion promoters. In some embodiments, the adhesion promoter is mono(meth) acrylate with carboxylic acid or carboxylic anhydride.

In some embodiments, the curable composition may further comprise a secondary adhesion promotor. The secondary adhesion promoter may be selected from (3-acryloxypropyl)trimethoxysilane, methacryloxypropyltrimethoxysilane, (3-acryloxypropyl) methyldimethoxysilane, (methacryloxymethyl) methyldiethoxysilane, methacryloxypropyldimethylethoxysilane, methacryloxypropyldimethylmethoxysilane, and combinations thereof.

In some embodiments, the light curable composition comprises 15-40 wt. % of one or more adhesion promoters.

Corrosion Inhibitors

Examples of suitable corrosion inhibitors include, for example, primary, secondary and tertiary aliphatic amines; aliphatic diamines; cycloaliphatic and aromatic amines; polymethylimines; long alkyl chain ethanolamines; imidazolines; amine-epoxy adduct solids, such as FUJICURE FXR-1020, ANCAMINE® 2442, FUJICURE FXR-1080, amine salts of an aromatic sulfonic acid, NACORR® 1754, for example those of carbonic, carbamic, acetic, benzoic, oleic, nitrous and chromic acids; acetylenic alcohols; lauric alcohol; alkyl chromates; organic esters of nitrous acid; organic esters of phthalic acid; organic esters of carbonic acid; nitronaphthalene; nitrobenzene; amides; mixtures of nitrites with urea, urotropine, or ethanolamines; naphthols; thiourea derivatives; heterocyclic compounds such as benzotriazole, triazoles, mercaptobenzothiazole and their respective salts; nitrated or sulfonated petroleum derivatives; and zinc phosphate complex LUBRIZOL® 219, dodecenyl succinic acid LUBRIZOL® 541. In some embodiments, the corrosion inhibitor comprises at least one of a triazole, an imidazoline, an amine, a zinc phosphate complex and dodecenyl succinic acid. In some embodiments, the light curable compositions typically comprise less than 5 wt. % of one or more corrosion inhibitors.

Reactive Diluents

Suitable reactive diluents for use in the compositions include one or more monomers that have a single ethylenically unsaturated group that is typically miscible with the urethane multifunctional (meth)acrylate. Mono (meth)acrylates can reduce crosslinking density so that the cured composition is elastomeric. Examples of mono (meth)acrylates include benzyl methacrylate, isooctyl acrylate (e.g., commercially available as SR-440 from Sartomer, Exton, Pa.), isodecyl acrylate (e.g., commercially available as SR-395 from Sartomer), isobornyl acrylate (e.g., commercially available as SR-506 from Sartomer), 2-phenoxyethyl acrylate (e.g., commercially available as SR-339 from Sartomer), alkoxylated tetrahydrofurfuryl acrylate (e.g., commercially available as CD-611 from Sartomer), 2(2-ethoxyethoxy)ethylacrylate (e.g., commercially available as SR-256 from Sartomer), ethoxylated nonylphenol acrylate (e.g., commercially available as SR-504 from Sartomer), propoxylated tetrahydrofurfuryl acrylate (e.g., commercially available as SR-611 from Sartomer), 2-phenoxyethyl methacrylate (e.g., commercially available as SR-340 from Sartomer), tetrahydrofurfuryl methacrylate (e.g., commercially available as SR-203 from Sartomer), alkoxylated phenol acrylate monomer (e.g., commercially available as SR-9087 from Sartomer), p-cumyl phenoxyethyl acrylate (commercially available as CD590 from Sartomer), 2-hydroxy-3-phenoxypropyl acrylate (commercially available as CN3100 from Sartomer), acrylic oligomer (commercially available as CN 2285 from Sartomer), phenol (EO)2 acrylate (commercially available as MIRAMER M142 from Miwon), Nonyl phenol (PO)2 acrylate (commercially available as MIRAMER M1602 from Miwon), o-phenylphenol EO acrylate (commercially available as MIRAMER M1142 from Miwon) Other reactive diluent monomers include, for example, methyl styrene, styrene, divinyl benzene, and the like.

Other suitable reactive diluents comprise monomers with a single ethylenically unsaturated group having a urethane linkage (—NH—(CO)—O—), such as urethane (meth)acrylates and 2-[[(butylamino)carbonyl]oxy]ethyl acrylate, which is commercially available under the trade designation GENOMER G1122 from Rahn USA Corp. in Aurora, Ill.

Suitable reactive diluents typically do not include monomers having ethylenically unsaturated groups containing an ionic group, such as an acidic group or an amino group or monomers having ethylenically unsaturated groups containing a hydroxyl group.

In some embodiments, the light curable composition can comprise 10-80 wt. %, more particularly 20-40 wt. % of one or more reactive diluents.

Preferably, the light curable compositions comprise low volatile organics (VOC). Such compositions are good for the environment and reduce potential odors generated by the curing process. In preferred embodiments, the reactive diluent has a vapor pressure less than 0.1 Pa at 25° C., more particularly less than 0.01 Pa, and even more particularly less than 0.001 Pa. Such diluents are less likely to be volatized during the curing process. In some embodiment, the diluent comprises a mono(meth)acrylate.

Radical Inhibitors

Radical inhibitors may optionally be added to prevent premature curing by light, heat and air. For example, stable radical compounds which can trap free radicals are used to inhibit radical polymerization. Exemplary radical inhibitors include 4-tert-butylpyrocatechol, tert-butylhydroquinone, 1,4-benzoquinone, 6-tert-butyl-2,4-xylenol, dibutylhydroxytoluene, 2,6-di-tert-butylphenol, 1,1-diphenyl-2-picrylhydrazyl, hydroquinone, 4-methoxyphenol, phenothiazine, N-oxyl hindered amine esters, such as 2,2,6,6-tetramethylpiperidine 1-oxyl (TEMPO), 4-Hydroxy-TEMPO. In some embodiments, the light curable composition comprises 0.01-1 wt. % of one or more radical inhibitors.

Photobleachable Dyes/Agents

Suitable photobleachable dyes/agents include, for example, aminoanthraquinone dyes, azo dyes, and combinations thereof. Additional exemplary photobleachable dyes/agents include, Rose Bengal, Methylene Violet, Methylene Blue, Fluorescein, Eosin Yellow, 65 Eosin Y, Ethyl Eosin, Eosin bluish, Eosin B, Erythrosin B, Erythrosin Yellowish Blend, Toluidine Blue, Disperse blue 60, oil blue A, 4',5'-Dibromofluorescein, monoamine anthraquinone, diaminoanthraquinone, and blends thereof. In some embodiments, the light curable composition comprises 0.0001 wt. % to 5 wt. % of one or more photobleaching dyes/agents.

Crosslinking Agent

In some embodiments, the curable composition may optionally include multifunctional (meth)acrylate crosslinking agents. Exemplary agents include trimethylolpropane trimethacrylate (SR350 from Sartomer), trimethylolpropane triacrylate (SR351 from Sartomer), 1,6-hexanediol di(meth)acrylate (HDDA from UCB Radcure, Inc. of Smyrna, Ga.), tripropylene glycol di(meth)acrylate, polyethylene glycol di(meth)acrylate (Sartomer 344), tripropylene glycol di(meth)acrylate, neopentyl glycol dialkoxy di(meth)acrylate, polyethyleneglycol di(meth)acrylate, 1,3-butylene glycol diacrylate (e.g., commercially available as SR-212 from Sartomer), 1,6-hexanediol diacrylate (e.g., commercially available as SR-238 from Sartomer), neopentyl glycol diacrylate (e.g., commercially available as SR-247 from Sartomer), and diethylene glycol diacrylate (e.g., commercially available as SR-230 from Sartomer). Crosslinking agents preferably do not contain urethane functional groups.

In some embodiments, the light curable composition comprises 0.1-10 wt % of one or more crosslinking agents. Higher amounts of crosslinking agent can diminish the elasticity of the curable composition, making it less flexible for sealant applications.

Other Components

Other components that may be optionally added to the light curable composition include pigments, surfactants, thixotropic agents, fire retardants, masking agents, and combinations of any of the foregoing. In some embodiments, glass fibers (e.g., glass clothe, fiberglass matt, and chopped fiberglass) can be added to create a cured composite that can be used in car repair applications. In some embodiments, the light curable compositions comprise up to 20 wt. % of one or more additional components.

EXAMPLES

Materials

| Abbreviation or Trade Name | Description |
| --- | --- |
| CN973H85 | An aromatic polyester-based urethane diacrylate oligomer blended with 15% SR256, 2(2-ethoxyethoxy) ethyl acrylate, available under the trade designation "CN973H85" from Sartomer Company (West Chester, Pennsylvania). |
| SR339 | 2-phenoxyethyl acrylate available under the trade designation "SR339" from Sartomer Company (West Chester, Pennsylvania). |
| CD590 | An aromatic acrylate available under the trade designation "CD590" from Sartomer Company (West Chester, Pennsylvania). |
| Irgacure 819 | Phenylbis(2,4,6-trimethylbenzoyl)phosphine oxide available under the trade designation "IRGACURE 819" from BASF Corporation (Florham Park, New Jersey). |
| HEMA Succinate | mono-2-(Methacryloyloxy)ethyl succinate available from Sigma-Aldrich (St. Louis, Missouri). |
| Benzotriazole | Benzotriazole available from Sigma-Aldrich. |
| Disperse Blue 60 | Disperse Blue 60 dye, CAS Number 12217-80-0, available from Sigma-Aldrich. |
| 4-OH TEMPO | 4-Hydroxy-2,2,6,6-tetramethylpiperidine 1-oxyl, available under the trade designation "PROSTAB 5198" from BASF Corporation. |
| Cabosil TS-720 | A medium surface area fumed silica which has been surface modified with polydimethylsiloxane available under the trade designation "CAB-O-SIL TS-720" from Cabot Corporation (Billerica, Massachusetts). |
| W210 filler | A ceramic microsphere having an effective d90 particle size of 12 μm, available under the trade designation "3M CERAMIC MICROSPHERE WHITE GRADE W-210" from 3M Company (St. Paul, Minnesota). |
| W410 filler | A ceramic microsphere having an effective d90 particle size of 21 μm, available under the trade designation "3M CERAMIC MICROSPHERE WHITE GRADE W-410" from 3M Company (St. Paul, Minnesota). |
| W610 filler | A ceramic microsphere having an effective d90 particle size of 32 μm, available under the trade designation "3M CERAMIC MICROSPHERE WHITE GRADE W-610" from 3M Company (St. Paul, Minnesota). |
| Minex 3 filler | A micronized functional filler with a median particle size of 11.0 μm available under the trade designation "MINEX 3 NEPHELINE SYNITE" from the Cary Company (Addison, Illinois). |
| Minex 7 filler | A micronized functional filler with a median particle size of 4.3 μm available under the trade designation "MINEX 7 NEPHELINE SYNITE" from the Cary Company. |
| Minex 10 filler | A micronized functional filler with a median particle size of 2.4 μm available under the trade designation "MINEX 10 NEPHELINE SYNITE" from the Cary Company. |
| Dualite E065-135D filler | An ultra-low density polymeric product that has an inert calcium carbonate coating, 125-145 μm, available under the trade designation "DUALITE E065-135D" from Henkel Corporation (Rocky Hill, Connecticut). |
| Imerseal 75 filler | A fine ground calcium carbonate, available under the trade designation "IMERSEAL 75" from Fitz Chem LLC (Itasca, Illinois). |
| Schott Glass filler | An inert dental glass, 2.0 μm particle size, available under the trade designation "GM27884" from Schott (Southbridge Massachusetts). |
| Quartz Powder filler | Purchased from Ron Coleman Mining (Jessieville, AR), 3M milled down to 5.19-10.81 μm. |
| Dragonite-XR | Halloysite Clay with diameter of 100 nm and average length of 0.2-2 mm, from Applied Minerals (New York, New York). |
| Bentone 34 | Organically modified bentonite clay from Elementis Specialties, Inc. (East Windsor, New Jersey). |
| TALC talcum | Hydrous Mg silicate from Luzenac America, Inc. (Centennial, Colorado). |
| 3M glass bubbles K15 | Hollow glass microsphere with a median particles size of 60 μm, made by 3M |
| Dadco ATH-SH20 | Alumina trihydrate round particles with a median particles size of 112.9 μm, purchased from Dadco (Plymouth, Michigan) |

Test Methods

Odor/Fuming Test

A 25.4 mm×50.8 mm×4.6 mm rubber mold was placed on freshly prepared air dried cold roll steel panel. The mixtures of the components listed in following tables were placed in the mold. The mixture in the mold was then cured using a light-emitting curing device (CF2000 obtained from Clearstone Technologies Inc.) at 100% power for five second. The curing device was placed approximately 10 mm away from the mold during the curing process. Odor/fuming was evaluated by visual/smell comparison.

Depth-of-Cure Measurement

A silicone mold having dimensions of 30 mm (length)×30 mm (width)×20 mm (depth) was used to prepare Depth-of-Cure samples. The mold was filled with a resin mixture. The mixture was cured from one end of the mold for 5 seconds, using a LED light with measured output of 2 W/cm$^2$ (as measured at 400-500 nm with a Opsytec De. Grobel UV PAD 260-500 nm high power sensor). Immediately after exposure, the sample was removed from the mold and a plastic spatula was used to remove uncured material from the cured sample. The thickness of the cured sample was then measured with a digital caliper. Three samples were obtained for each resin mixture and the average thickness and standard deviation reported. The average thickness was taken as the depth of cure of the sample.

Refractive Index Measurements

Refractive indices of monomers, curable compositions without inorganic fillers, and cured compositions without inorganic fillers were measured with a Bausch & Lomb refractometer at 25° C., using the sodium "D" line (~589 nm).

Refractive indices of the inorganic fillers were determined using Becke lines and a refractive index standard kit from RP Cargill Laboratories, Inc. (Cedar Grove, N.J.). The refractive index standard kit contained liquids with a refractive index of 1.400 to 1.700 at intervals of 0.004. A drop of refractive index standard was placed on a microscope slide. A small amount (~1 mg) of particles was stirred into it using a small spatula. The particles in the liquid were then examined by a light microscope, usually at 500× magnification. A single particle was brought into focus, and then the microscope stage holding the sample was lowered. If the material was not of the same refractive index as the oil, Becke lines (bright lines around the edges of the particle) appeared as the stage was lowered. As the stage was lowered, these lines moved into the material (i.e. refractive index liquid or particle) with the greater refractive index. If the lines moved into the particle, the particle had a higher refractive index than the liquid surrounding it. Several more particles in the sample were examined to verify this behavior. A refractive index liquid with a higher index was then selected and the test repeated. If the lines moved into the liquid, the liquid had a higher refractive index than the particle. Multiple particles in the sample were examined to verify this behavior. Then, a refractive index liquid with a lower index was selected and the test repeated. In this way, it was possible to bracket the numerical value of a specific particle's refractive index.

The refractive index for materials used herein are provided in Table 1 below.

TABLE 1

Refractive Index and Density of Materials used in Examples

| Material | Refractive Index (n) (measured) | Birefringence (δ) | Density (g/cm$^3$) |
| --- | --- | --- | --- |
| CN973H85 | 1.478 | n/a | 1.089 |
| HEMA Succinate | 1.465 | n/a | 1.196 |
| Genomer 1122 | 1.465 | n/a | 1.07 |
| SR339 | 1.517 | n/a | 1.105 |
| CD590 | 1.552 | n/a | 1.1 |
| W210 filler | 1.498 | <0.01[b] | 2.4 |
| W410 filler | 1.498 | <0.01[b] | 2.5 |
| W610 filler | 1.498 | <0.01[b] | 2.5 |
| Minex 3 filler | 1.528 | 0.004[c] | 2.61 |
| Minex 7 filler | 1.528 | 0.004[c] | 2.61 |
| Minex 10 filler | 1.528 | 0.004[c] | 2.61 |
| Dragonite-XR | 1.536 | 0.020[c] | 2.53 |
| Dualite EO65-135D filler | <1.400[a] | Unavailable | 0.065 |
| Imerseal 75 filler | 1.594 | 0.172[c] | 2.720 |
| Bentone 34 | 1.566 | 0.016[c] | 1.70 |
| TALC talcum | 1.554 | 0.051[c] | 2.58-2.83 |
| Dadco ATH SH20 | 1.586 | 0.019[c] | 2.42 |
| 3M glass bubbles K15 | 1.030 | Isotropic | 0.15 |
| Schott glass filler | 1.534 | isotropic | 2.8 |
| Quartz powder filler | 1.542 | 0.009[c] | 2.64 |

[a]Smaller than oil with 1.400 refractive index when using Becke line and the refractive index standard kit as described herein.
[b]Estimate based upon publicly available information.
[c]Values obtained from the literature.

The Glass Transition Temperature (T$_g$) Measurement

The glass transition temperature (T$_g$) was measured by differential scanning calorimetry (DSC). About 5 milligrams of each sample were placed in individual standard aluminum DSC pans (TA Instruments, Eden Prairie, Minn., product number T160309 for the pan and T160425 for the lid) and placed in the auto sampler of a dynamic scanning calorimeter (DSC Q200, TA Instruments). For each sample, pans containing the sample were individually placed on one of the differential posts in the DSC's enclosed cell along with an empty reference pan on the opposite post. The temperature was raised to 150° C. at 10° C./min under nitrogen atmosphere and held at 150° C. for 2 minutes. Thereafter, the sample was cooled down to −60° C. at the same rate, and held at −60° C. for 2 minutes before once again raising the temperature to 150° C. at 10° C./min. The T$_g$ values were identified in the scanning profile of heat flow vs. temperature. Typically, a glass transition is generally represented by a shift in the profile slope upon heating as the heat capacity of the sample after the transition is altered. The T$_g$ was recorded at the inflection point of the curve associated with this shift in heat flow profile, also referred to as the midpoint temperature in ASTM E1356-08 (2014).

T-peel Test

T-peel test was used to quantitatively measure the adhesion to bare cold-roll steel metal (cold rolled steel, type 1018, 20 gauge thickness). A 0.3 inch (7.6 mm)×3 inch (7.6 cm) T-peel metal specimen was abraded, washed with IPA and air dried immediately before applying the curable composition. A 2.5 mm thick layer of resin mixture was dispensed on the T-peel metal strip. The resin mixture was cured from both sides of the T-peel metal specimen where resin was exposed for 30 seconds by using light-emitting curing device (CF2000 obtained from Clearstone Technologies Inc.) at 100% power, placed approximately 10 mm away from the resin mixture. A 180° peel test was conducted on an Instron tensile tester at an extension rate of 2.0 inch/min (5.1 cm). Data was reported as Peel Strength (N/mm) and Peak Load (N). Five specimens for each sample were measured to obtain an average value and standard deviation value.

Corrosion Test

To evaluate corrosion resistance properties, an accelerated corrosion test was performed according to ASTM B117. A resin mixture was coated on freshly abraded cold-rolled steel panels at a thickness of 50 mils (1270 micrometers) and cured by using a light-emitting curing device for 5 seconds. 2K Epoxy resin (DP401LV/DP90LV in 2/1 ratio, PPG) was applied with a paintbrush to the edges of the cured resin mixture to seal the edges. The corrosion test was conducted by salt spray exposure in an aqueous 5 wt. % sodium chloride solution, supplied with an air-sparging system for 3 weeks. After 3 weeks, samples were removed and the degree of corrosion was evaluated. Corrosion was evaluated by visual inspection, and was rated as follows: 5=less than 5% of surface area exhibits corrosion; 3=from 25-35% of surface area exhibits corrosion; 1=more than 70% of the surface area exhibits corrosion.

Procedures

Preparation of Resin Mixtures

Resin mixtures were prepared by combining all the ingredients at the indicated concentrations, where the amounts of each component are given in parts by weight (in grams). A resin mixture was made by charging an amber glass jar with the components listed for each specific example, minus the Cabosil TS-720 and the filler. The amber glass jar was heated on a hot roller at 80° C. until the components were substantially dissolved. The warm mixture was transferred to an opaque plastic speed mixer jar, where upon the Cabosil TS-720 and fillers were added.

Resins 1-3 (without Inorganic Fillers)

Polymerizable monomers, oligomers, photoinitiator, dye, stabilizer, corrosion inhibitor (benzotriazole), and reinforcing silica (Cabosil TS-720) were mixed using a high speed mixer (DAC 600.1 FVZ, FlackTek, Inc.) at 2500 rpm for 1 min for three times to form Resins 1 to 3. The compositions of Resins 1 to 3 are detailed in Tables 2-4.

TABLE 2

Formulation of Resin 1

|  | g | % |
| --- | --- | --- |
| Genomer 1122 | 40 | 34.01% |
| CN973H85 | 30 | 25.51% |
| HEMA Succinate | 30 | 25.51% |
| Irgacure 819 | 5 | 4.25% |
| Cabosil TS-720 | 6.5 | 5.53% |
| Benzotriazole | 2 | 1.70% |
| 4-OH TEMPO | 0.1 | 0.09% |
| SR350 | 4 | 3.40% |
| Disperse Blue 60 | 0.8 mg | 0.00% |
| sum | 117.6 | 100.00% |

TABLE 3

Formulation of Resin 2

|  | g | % |
| --- | --- | --- |
| SR339 | 40 | 34.01% |
| CN973H85 | 30 | 25.51% |
| HEMA Succinate | 30 | 25.51% |
| Irgacure 819 | 5 | 4.25% |
| Cabosil TS-720 | 6.5 | 5.53% |
| Benzotriazole | 2 | 1.70% |

TABLE 3-continued

Formulation of Resin 2

|  | g | % |
| --- | --- | --- |
| 4-OH TEMPO | 0.1 | 0.09% |
| SR350 | 4 | 3.40% |
| Disperse Blue 60 | 0.8 mg | 0.00% |
| sum | 117.6 | 100.00% |

TABLE 4

Formulation of Resin 3

|  | g | % |
| --- | --- | --- |
| CD590 | 40 | 34.01% |
| CN973H85 | 30 | 25.51% |
| HEMA Succinate | 30 | 25.51% |
| Irgacure 819 | 5 | 4.25% |
| cabosil TS-720 | 6.5 | 5.53% |
| Benzotriazole | 2 | 1.70% |
| 4-OH TEMPO | 0.1 | 0.09% |
| SR350 | 4 | 3.40% |
| Disperse Blue 60 | 0.8 mg | 0.00% |
| sum | 117.6 | 100.00% |

Using the Refractive Index Measurement and Depth-of-Cure Measurement, the refractive index and depth of cure values were determined for the resins without filler, Resins 1-3, prior to and after photo curing. Measured refractive index values and Depth-of-Cure values are summarized in Table 5.

TABLE 5

Resin 1-3 Refractive Index and Depth of Cure

|  | Reactive Diluent | Refractive Index of Uncured Resin | Refractive Index of Cured Resin ($n_{matrix}$) | Depth of Cure (mm) | Tg (° C.) Cured Resin |
| --- | --- | --- | --- | --- | --- |
| Resin 1 | Genomer 1122 | 1.473 | 1.501 | 14.59 ± 0.08 | −8.80 |
| Resin 2 | SR339 | 1.496 | 1.527 | 12.46 ± 0.11 | −5.30 |
| Resin 3 | CD590 | 1.508 | 1.531 | 10.31 ± 0.23 | −3.65 |

Examples 1 to 23 (Ex-1 to Ex. 23) and Comparative Examples 1 to 7 (CE-1 to CE-7)

Resin mixtures containing the fillers, Examples 1 to 23, and comparative resin mixtures, Comparative Examples 1 to 7 are described in Tables 6 through 10. Using the Refractive Index Measurement and Depth-of-Cure Measurement, the refractive index and depth of cure values for the Examples and Comparative Examples were determined. The results are shown in Table 11.

TABLE 6

Formulation of Examples 1-5

|  | EX-1 | EX-2 | EX-3 | EX-4 | EX-5 |
| --- | --- | --- | --- | --- | --- |
| Genomer 1122 | 29.57% | 29.57% | 29.57% | 29.57% | 29.57% |
| CN973H85 | 22.18% | 22.18% | 22.18% | 22.18% | 22.18% |

TABLE 6-continued

Formulation of Examples 1-5

| | EX-1 | EX-2 | EX-3 | EX-4 | EX-5 |
|---|---|---|---|---|---|
| HEMA Succinate | 22.18% | 22.18% | 22.18% | 22.18% | 22.18% |
| Irgacure 819 | 3.70% | 3.70% | 3.70% | 3.70% | 3.70% |
| Cabosil TS-720 | 4.81% | 4.81% | 4.81% | 4.81% | 4.81% |
| Benzotriazole | 1.48% | 1.48% | 1.48% | 1.48% | 1.48% |
| 4-OH TEMPO | 0.08% | 0.08% | 0.08% | 0.08% | 0.08% |
| Disperse Blue 60 | 0.00% | 0.00% | 0.00% | 0.00% | 0.00% |
| SR350 | 2.96% | 2.96% | 2.96% | 2.96% | 2.96% |
| W210 filler | 13.04% | | | | |
| W410 filler | | 13.04% | | | |
| W610 filler | | | 13.04% | | |
| Schott glass filler | | | | 13.04% | |
| Quartz powder filler | | | | | 13.04% |

TABLE 9

Formulation of Examples 20-24

| | EX-20 | EX-21 | EX-22 | EX-23 | EX-24 |
|---|---|---|---|---|---|
| CD590 | 29.57% | 29.57% | 29.57% | 29.57% | 29.57% |
| CN973H85 | 22.18% | 22.18% | 22.18% | 22.18% | 22.18% |
| HEMA Succinate | 22.18% | 22.18% | 22.18% | 22.18% | 22.18% |
| Irgacure 819 | 3.70% | 3.70% | 3.70% | 3.70% | 3.70% |
| Cabosil TS-720 | 4.81% | 4.81% | 4.81% | 4.81% | 4.81% |
| Benzotriazole | 1.48% | 1.48% | 1.48% | 1.48% | 1.48% |
| 4-OH TEMPO | 0.08% | 0.08% | 0.08% | 0.08% | 0.08% |
| Disperse Blue 60 | 0.00% | 0.00% | 0.00% | 0.00% | 0.00% |
| SR350 | 2.96% | 2.96% | 2.96% | 2.96% | 2.96% |
| W210 filler | 13.04% | | | | |
| W410 filler | | 13.04% | | | |
| W610 filler | | | 13.04% | | |
| Minex 3 filler | | | | 13.04% | |
| Minex 7 filler | | | | | 13.04% |

TABLE 7

Formulation of Examples 6-11

| | EX-6 | EX-7 | EX-8 | EX-9 | EX-10 | EX-11 |
|---|---|---|---|---|---|---|
| SR339 | 30.92% | 30.92% | 30.92% | 30.92% | 30.92% | 30.92% |
| CN973H85 | 23.19% | 23.19% | 23.19% | 23.19% | 23.19% | 23.19% |
| HEMA Succinate | 23.19% | 23.19% | 23.19% | 23.19% | 23.19% | 23.19% |
| Irgacure 819 | 3.86% | 3.86% | 3.86% | 3.86% | 3.86% | 3.86% |
| Cabosil TS-720 | 5.03% | 5.03% | 5.03% | 5.03% | 5.03% | 5.03% |
| Benzotriazole | 1.55% | 1.55% | 1.55% | 1.55% | 1.55% | 1.55% |
| 4-OH TEMPO | 0.08% | 0.08% | 0.08% | 0.08% | 0.08% | 0.08% |
| Disperse Blue 60 | 0.00% | 0.00% | 0.00% | 0.00% | 0.00% | 0.00% |
| SR350 | 3.09% | 3.09% | 3.09% | 3.09% | 3.09% | 3.09% |
| W210 filler | 9.09% | | | | | |
| W410 filler | | 9.09% | | | | |
| W610 filler | | | 9.09% | | | |
| Minex 3 filler | | | | 9.09% | | |
| Minex 7 filler | | | | | 9.09% | |
| Minex 10 filler | | | | | | 9.09% |

TABLE 8

Formulation of Examples 12-19

| | EX-12 | EX-13 | EX-14 | EX-15 | EX-16 | EX-17 | EX-18 | EX-19 |
|---|---|---|---|---|---|---|---|---|
| SR339 | 28.34% | 28.34% | 28.34% | 26.86% | 24.29% | 29.57% | 29.57% | 28.34% |
| CN973H85 | 21.26% | 21.26% | 21.26% | 20.15% | 18.22% | 22.18% | 22.18% | 21.26% |
| HEMA Succinate | 21.26% | 21.26% | 21.26% | 20.15% | 18.22% | 22.18% | 22.18% | 21.26% |
| Irgacure 819 | 3.54% | 3.54% | 3.54% | 3.36% | 3.04% | 3.70% | 3.70% | 3.54% |
| Cabosil TS-720 | 4.61% | 4.61% | 4.61% | 4.37% | 3.95% | 4.81% | 4.81% | 4.61% |
| Benzotriazole | 1.42% | 1.42% | 1.42% | 1.34% | 1.21% | 1.48% | 1.48% | 1.42% |
| 4-OH TEMPO | 0.08% | 0.08% | 0.08% | 0.07% | 0.06% | 0.08% | 0.08% | 0.08% |
| Disperse Blue 60 | 0.00% | 0.00% | 0.00% | 0.00% | 0.00% | 0.00% | 0.00% | 0.00% |
| SR350 | 2.83% | 2.83% | 2.83% | 2.69% | 2.43% | 2.96% | 2.96% | 2.83% |
| W410 filler | 16.17% | | | | | | | |
| W610 filler | | 16.17% | | 21.01% | 28.57% | | | |
| Minex 3 filler | | | 16.17% | | | | | |
| Schott glass filler | | | | | | 13.04% | | |
| quartz powder filler | | | | | | | 13.04% | |
| Dragonite | | | | | | | | 16.17% |

TABLE 10

Formulation of Comparative Examples 1-7

|  | CE-1 | CE-2 | CE-3 | CE-4 | CE-5 | CE-6 | CE-7 |
|---|---|---|---|---|---|---|---|
| SR339 | 33.84% | 33.18% | 30.92% | 30.92% | 30.92% | 30.92% | 32.39% |
| CN973H85 | 25.38% | 24.89% | 23.19% | 23.19% | 23.19% | 23.19% | 24.30% |
| HEMA Succinate | 25.38% | 24.89% | 23.19% | 23.19% | 23.19% | 23.19% | 24.30% |
| Irgacure 819 | 4.23% | 4.15% | 3.86% | 3.86% | 3.86% | 3.86% | 4.05% |
| Cabosil TS-720 | 5.50% | 5.40% | 5.03% | 5.03% | 5.03% | 5.03% | 5.27% |
| Benzotriazole | 1.69% | 1.66% | 1.55% | 1.55% | 1.55% | 1.55% | 1.62% |
| 4-OH TEMPO | 0.09% | 0.09% | 0.08% | 0.08% | 0.08% | 0.08% | 0.09% |
| Disperse Blue 60 | 0.00% | 0.00% | 0.00% | 0.00% | 0.00% | 0.00% | 0.00% |
| SR350 | 3.38% | 3.32% | 3.09% | 3.09% | 3.09% | 3.09% | 3.24% |
| Dualite EO65-135D | 0.50% | 2.44% | | | | | |
| Imerseal 75 | | | 9.09% | | | | |
| Bentone 34 | | | | 9.09% | | | |
| TALC talcum | | | | | 9.09% | | |
| Dadco ATH SH20 | | | | | | 9.09% | |
| 3M glass bubble | | | | | | | 4.76% |

TABLE 11

Depth of Cure

|  | Resin[a] | Filler | Filler Refractive Index ($n_{filler}$) | Absolute Value of Difference Between Refractive Indices of Filler and Cured Resin $|n_{filler} - n_{matrix}|$ | Sum[b] of Absolute Value of Difference Between Filler and Cured Resin Plus Birefringence of Filler | Depth of Cure (mm) |
|---|---|---|---|---|---|---|
| EX-1 | Resin 1 | W210 | 1.498 | 0.003 | <0.013 | 8.88 ± 0.25 |
| EX-2 | Resin 1 | W410 | 1.498 | 0.003 | <0.013 | 9.34 ± 0.09 |
| EX-3 | Resin 1 | W610 | 1.498 | 0.003 | <0.013 | 9.56 ± 0.01 |
| EX-4 | Resin 1 | Schott glass | 1.534 | 0.033 | 0.033 | 8.35 ± 0.39 |
| EX-5 | Resin 1 | quartz powder | 1.542 | 0.041 | 0.050 | 8.15 ± 0.19 |
| EX-6 | Resin 2 | W210 | 1.498 | 0.029 | <0.039 | 9.09 ± 0.12 |
| EX-7 | Resin 2 | W410 | 1.498 | 0.029 | <0.039 | 10.33 ± 0.14 |
| EX-8 | Resin 2 | W610 | 1.498 | 0.029 | <0.039 | 10.76 ± 0.09 |
| EX-9 | Resin 2 | Minex 3 | 1.528 | 0.001 | 0.005 | 11.05 ± 0.34 |
| EX-10 | Resin 2 | Minex 7 | 1.528 | 0.001 | 0.005 | 10.25 ± 0.28 |
| EX-11 | Resin 2 | Minex 10 | 1.528 | 0.001 | 0.005 | 10.23 ± 0.22 |
| EX-12 | Resin 2 | W410 | 1.498 | 0.029 | <0.039 | 8.38 ± 0.18 |
| EX-13 | Resin 2 | W610 | 1.498 | 0.029 | <0.039 | 7.68 ± 0.21 |
| EX-14 | Resin 2 | Minex 3 | 1.528 | 0.001 | 0.005 | 9.24 ± 0.09 |
| EX-15 | Resin 2 | W610 | 1.498 | 0.029 | <0.039 | 6.83 ± 0.21 |
| EX-16 | Resin 2 | W610 | 1.498 | 0.029 | <0.039 | 6.77 ± 0.21 |
| EX-17 | Resin 2 | Schott glass | 1.534 | 0.007 | 0.007 | 7.39 ± 0.09 |
| EX-18 | Resin 2 | quartz powder | 1.542 | 0.015 | 0.024 | 8.62 ± 0.27 |
| EX-19 | Resin 2 | Dragonite | 1.536 | 0.009 | 0.029 | 5.09 ± 0.12 |
| EX-20 | Resin 3 | W210 | 1.498 | 0.033 | <0.043 | 6.56 ± 0.02 |
| EX-21 | Resin 3 | W410 | 1.498 | 0.033 | <0.043 | 6.85 ± 0.25 |
| EX-22 | Resin 3 | W610 | 1.498 | 0.033 | <0.043 | 7.56 ± 0.03 |
| EX-23 | Resin 3 | Minex 3 | 1.528 | 0.003 | 0.007 | 9.62 ± 0.13 |
| EX-24 | Resin 3 | Minex 7 | 1.528 | 0.003 | 0.007 | 9.72 ± 0.09 |
| CE-1 | Resin 2 | Dualite EO65-135D | <1.400 | >0.127 | >0.127 | 4.23 ± 0.35 |
| CE-2 | Resin 2 | Dualite EO65-135D | <1.400 | >0.127 | >0.127 | 2.51 ± 0.12 |
| CE-3 | Resin 2 | Imerseal 75 | 1.594 | 0.067 | 0.239 | 2.02 ± 0.08 |
| CE-4 | Resin 2 | Bentone 34 | 1.566 | 0.039 | 0.055 | 2.13 ± 0.04 |
| CE-5 | Resin 2 | TALC talcum | 1.554 | 0.027 | 0.078 | 4.52 ± 0.56 |
| CE-6 | Resin 2 | Dadco ATH SH20 | 1.586 | 0.059 | 0.078 | 4.34 ± 0.17 |
| CE-7 | Resin 2 | 3M glass bubble K15 | 1.040 | 0.487 | 0.487 | 3.45 ± 0.08 |

[a] Resin without filler.
[b] $|n_{filler} - n_{matrix}| + \delta_{filler}$

Using the T-peel Test, Corrosion Test and Odor/Fuming Test, the values for the T-peel adhesion, corrosion rating and odor rating were determined. Results are shown in Table 12.

TABLE 12

Adhesion, Corrosion and Odor Performance

| Sample # | T-peel (N/mm) | Corrosion Rating | Odor/ fuming | Tg (° C.) |
|---|---|---|---|---|
| EX-2 | 4.82 ± 0.24 | 3 | Low | −7.82 |
| EX-6 | 6.70 ± 0.38 | 5 | Medium | |
| EX-7 | 5.79 ± 0.27 | 5 | Medium | |
| EX-8 | 6.09 ± 0.48 | 5 | Medium | |
| EX-9 | 5.75 ± 0.26 | 5 | Medium | −5.40 |
| EX-12 | 5.52 ± 0.07 | 5 | Medium | |
| EX-13 | 6.16 ± 0.19 | 5 | Medium | |
| EX-14 | 5.43 ± 0.30 | 5 | Medium | |
| EX-21 | 6.30 ± 0.28 | 5 | Low | |
| EX-22 | 6.05 ± 0.35 | 5 | Low | −3.83 |
| EX-23 | 6.12 ± 0.23 | 5 | Low | |

Thus, the invention provides, among other things, a light curable system. Various features and advantages of the invention are set forth in the following claims.

What is claimed is:

1. A curable composition comprising:
   a urethane multifunctional (meth)acrylate;
   an inorganic filler having a primary particle dimension of at least 200 nm;
   a photoinitiator system that can be activated by electromagnetic radiation in the range of 340-550 nm;
   a reactive diluent; and
   reinforcing silica having a primary particle dimension of 100 nm or less,
   wherein $0.054 \geq |n_{filler} - n_{matrix}| + \delta_{filler}$, where $n_{filler}$ is the refractive index of the filler, $n_{matrix}$ is the refractive index of a fully cured composition without filler, and $\delta_{filler}$ is the birefringence of the filler;
   wherein the fully cured composition without filler is cured to a depth of at least 5 mm by exposure in the range of 400 to 500 nm at an intensity of 2 W/cm² for 5 seconds.

2. The composition of claim 1, wherein the composition comprises 10-60 wt. % of the urethane multifunctional (meth)acrylate.

3. The composition of claim 1, wherein the composition comprises 5-50 wt. % of the inorganic filler.

4. The composition of claim 1, wherein the composition comprises 10-80 wt. % of the reactive diluent.

5. The composition of claim 1, further comprising at least one of an adhesion promoter, a corrosion inhibitor, and combinations thereof.

6. The composition of claim 5, wherein the corrosion inhibitor comprises at least one of a triazole, an imidazoline, an amine, a zinc phosphate complex and dodecenyl succinic acid.

7. The composition of claim 1, wherein the urethane multifunctional (meth)acrylate has a number average molecular weight in the range of 900-20,000 Daltons (grams/mole).

8. The composition of claim 1, wherein the photoinitator system comprises a photoinitiator selected from the group consisting of

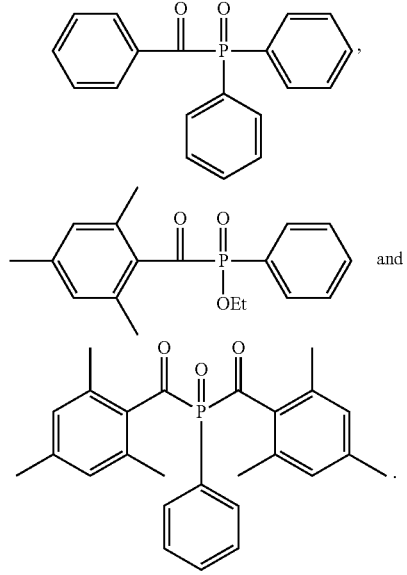

9. The composition of claim 1, wherein the photoinitiator system comprises a photoinitiator and a photosensitizer.

10. The composition of claim 1, wherein the reactive diluent comprises a mono(meth)acrylate that does not contain an acidic group, an amino group, an anhydride group or a hydroxyl group.

11. The composition of claim 1, wherein the reactive diluent has a vapor pressure less than 0.1 Pa at 25° C.

12. The composition of claim 1, further comprising a crosslinking agent comprising a multifunctional (meth)acrylate.

13. The composition of claim 1, further comprising a radical inhibitor.

14. The composition of claim 1, wherein the composition upon fully curing to a depth of at least 5 mm by exposure in the range of 400 to 500 nm at an intensity of 2 W/cm² for 5 seconds has a $T_g$ no greater than 30° C.

15. A method comprising:
   applying the composition from claim 1 to a substrate; and
   exposing the composition to electromagnetic radiation in the range of 340-550 nm at an intensity of 0.1-5 W/cm².

16. The method of claim 15, wherein the composition upon fully curing to a depth of at least 5 mm by exposure in the range of 400 to 500 nm at an intensity of 2 W/cm² for 5 seconds has a $T_g$ no greater than 30° C.

17. The method of claim 15, further comprising applying a primer to the substrate, wherein the primer is positioned between the substrate and composition.

* * * * *